Friedrich B. Bielfeldt
Inventor.
By Karl J. Ross Attorney

United States Patent Office 3,632,729
Patented Jan. 4, 1972

3,632,729
METHOD OF INJECTION MOLDING WITH THERMOSETTING RESINS
Friedrich Bernd Bielfeldt, Pappenheim, Germany, assignor to Eckert & Ziegler G.m.b.H., Weissenburg, Germany
Filed Aug. 21, 1969, Ser. No. 852,025
Claims priority, application Germany, Aug. 21, 1968, P 17 79 504.9
Int. Cl. B29f 1/100; B29g 3/00
U.S. Cl. 264—294                   3 Claims

ABSTRACT OF THE DISCLOSURE

A thermosetting resin is injected into a partially open separable mold having a mold cavity. This mold is then partially closed to precompress the resin and is heated to soften it. After a predetermined amount of time, the mold is fully closed to compress the mass of resin and to force it into every portion of the cavity. A telescoping mold and a valve between the mold and the injection head are used to prevent the mass from escaping during compression.

---

The present invention relates to a method for molding an article from a synthetic resin and, more particularly, from a thermosetting resin.

Injection molding has proven to be an extremely advantageous method of forming articles of synthetic resins. Generally speaking, this method consists of softening or melting (plasticizing) granular or powdered resin material and then forcing it under pressure into a mold. The pressure is maintained until the article hardens. Such a method is used universally for thermoplastic resins with excellent results; however, it is used only very rarely and with little success with resins of the thermosetting type.

Thermosetting resins, particularly the amino resins such as amine-cured epoxies, urea and melamine resins, have a strong tendency to shrink in the mold. Even with casting methods wherein more plasticized resin material is fed into the mold as the hardening body shrinks, this disadvantage can not be successfully overcome. Furthermore, the molecules of these thermosetting resins tend to align themselves in the direction of flow, thereby causing crack formation or alligatoring of the surface of the finished product.

For these reasons, some of the more complicated and expensive methods such as compression molding, had been necessary to mold articles from these thermosetting resins.

It is, therefore, the general object of the present invention to provide an improved method for molding thermosetting resins.

A more specific object is to provide such a method which overcomes the aforementioned disadvantages of earlier methods and represent an efficient, rapid and economical technique for forming articles of such resins of high quality.

The above objects are attained, by an apparatus having a separable mold, mold-closing means, injection means for forcing under pressure a mass of flowable synthetic-resin material into the mold cavity, and heating means for the mold.

The mold comprises a pair of telescopingly interfitting halves defining a mold cavity having a volume and configuration substantially identical to that of the desired finished molded article. According to the method of the present invention, the mold is not fully closed when the resin is injected thereinto. By this it is meant that the volume defined by the mold cavity is greater than the above-mentioned "final" volume (discounting any further volume change on cooling). In this manner, the resin enters the mold more easily so that a pressure which is less than that customarily used in injection molding may be employed. This lower pressure itself eliminates many of the above-mentioned disadvantages of the prior-art systems. The mold is then, in accordance with another feature of the present invention, heated to increase the flowability of the resin therein prior to complete hardening or setting of the resin. Finally, the mold is fully closed to compress the heated and less viscous resin mass and give it the exact shape desired for the finished article. The final mold-closure step forces the mass all through the mold cavity, while the simultaneous compression makes shrinkage almost insignificant. In this manner, the final product is formed perfectly, and its production bears the simplicity characterizing known injection-molding operations.

In order to ensure a more thorough heating of the mass prior to final compression, the mold is closed slightly after charging with the mass to an intermediate position. As the volume is thus slightly decreased, the mass enters into better conducting engagement with the walls of the mold cavity so that it is more quickly heated.

More specifically I have found that the ratio of the volume of the mold cavity at injection of the preheated and plasticized thermosetting mass should be in a ratio to the final volume of substantially 3:1 to 6:1 and preferably 4:1 to 5:1 whereas the volume ratio of the initial state to the intermediate state is 2:1 to 3:1.

In accordance with a further feature of the present invention, the passage through which the mass is injected into the mold is sealed during final compression to prevent back flow or leakage.

The above and other objects, features, and advantages will become more readily apparent from the following specific description and examples, reference being made to the accompanying drawing, in which.

Figure 1:
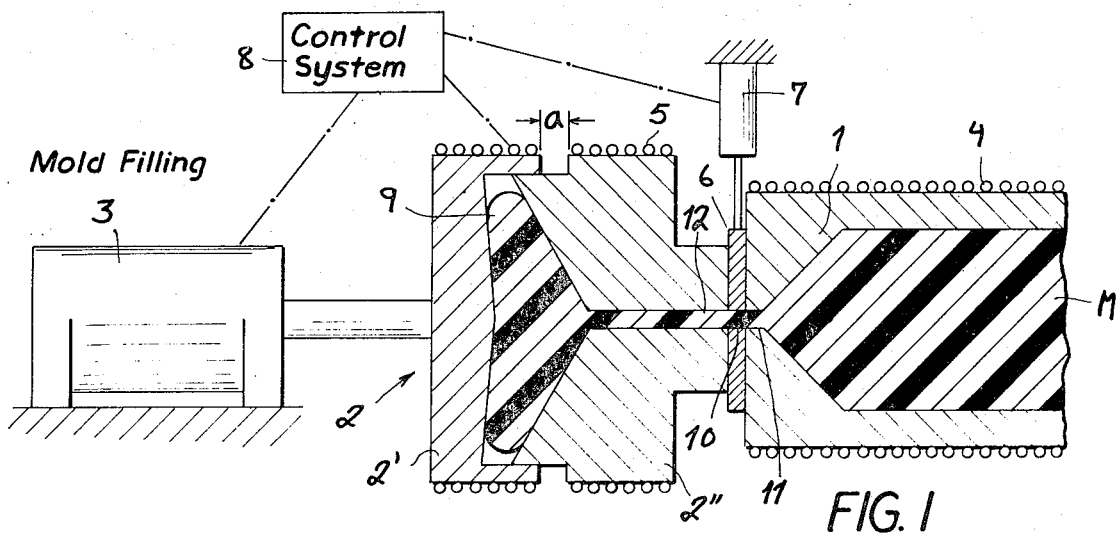
FIG. 1 shows an apparatus according to the present invention in its filling, primary position.
Figure 2:
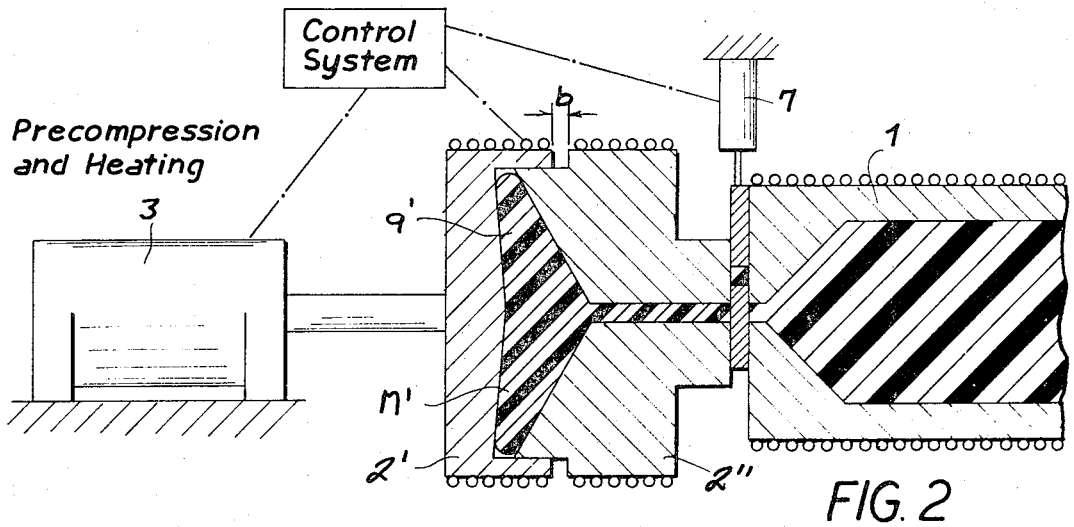
FIG. 2 shows the apparatus of FIG. 1 in an intermediate position.
Figure 3:
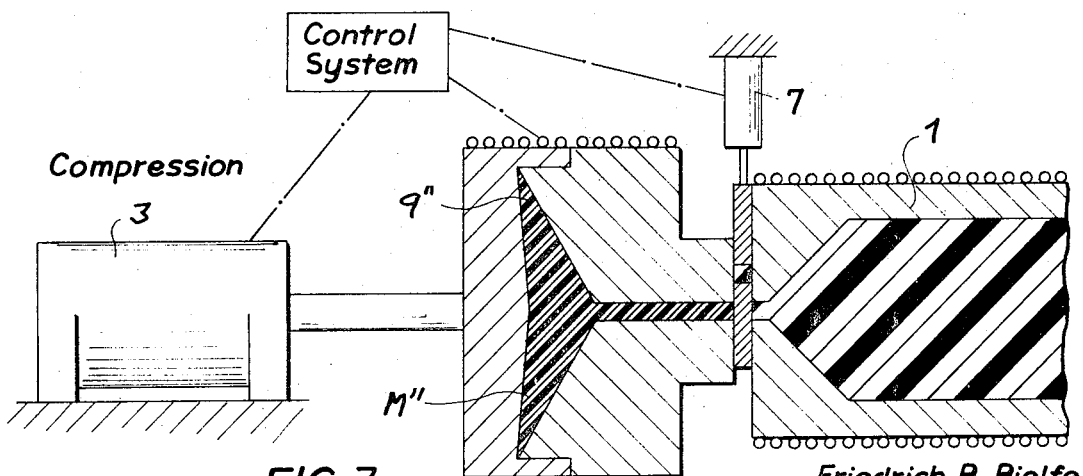
FIG. 3 shows the apparatus of FIG. 1 in its final position.

As shown in FIGS. 1–3, the apparatus comprises an injection head 1 of an injection-molding machine as described in the commonly owned patent application Ser. No. 818,275 filed April 22, 1969 by F. B. Bielfeldt and J. Neureuther and entitled "Screw-Type Injection-Molding Machine and Method of Operating Same." A separable mold 2 engages this head 1 and has two telescoping halves 2' and 2", the former being carried on a hydraulic cylinder 3 and the latter being fixed.

Wound around the head 1 is a winding of resistance wire 4 that serves to heat it and "soften" the resin material M therein, thereby reducing its viscosity and also bringing it to a thermoset more rapidly. A similar heating winding 5 is provided on the mold 2. Between the head 1 and mold 2 is a valve in the form of a plate 6 mounted on a hydraulic cylinder 7 and vertically movable to align an aperture 10 formed in the center of the plate 6 with passages 11 and 12 extending to each side of it in the head 1 and mold 2, respectively.

A control system 8 is connected to the cylinders 3 and 7 and to the winding 5 on the mold 2.

This apparatus operates as follows:

As shown in FIG. 1, the mass M is injected into a mold cavity 9 formed between the two halves which are held apart by gap $a$. This mass M is under enough pressure to enter the cavity 9, but generally not under such great pressure that it fills the cavity completely.

From FIG. 2 it can be seen how the cylinder 7 is actuated by the system 8 to move the plate 6 upwardly and bring the aperture 10 out of line with the passages 11 and 12 to prevent the now precompressed, preheated thermosetting resin mass M' from flowing back into the head 1. At the same time, the cylinder 3 is actuated to decrease the gap to a distance $b$, thereby decreasing the now slightly smaller volume of the cavity 9'; while the wires 5 are connected to heat the mold and further decrease the viscosity of the mass M' which now almost completely fills the cavity 9'.

Finally, as shown in FIG. 3, the mold 2 is fully closed by the cylinder 3 through the control system 8. Here the mold cavity 9" is at its smallest volume, while the mass M" is compressed therein. The mass M" cures and hardens in this position with or without further heating, although it is preferred to maintain the heating of the mold during setting and curing.

EXAMPLE I

A melamine-formaldehyde resin is forced from a reciprocating screw injection-molding machine through an extruding head into a mold as shown in FIG. 1, with the gap $a$ being equal to 5 mm. Heat is applied and the resin is softened. Then the mold is closed to a gap of 1 mm. and held closed, with a gate similar to the plate 6 blocking the mold entrance passage.

EXAMPLE II

A urea-formaldehyde resin, as above, from a reciprocating screw injection-molding machine is forced into a mold as shown in FIG. 1, with the gap $a$ being 5 mm. The gap is decreased to a gap $b$, as in FIG. 2, of 2 mm., and the mold is heated. After softening, the mold is fully closed (1 mm. gap) and the mass is allowed to cure, with a gate 6 blocking the mold entry passage only during the final compression step.

I claim:
1. A method of molding a synthetic-resin article of predetermined volume and configuration, said method comprising:
   injecting under pressure a mass of plasticized synthetic-resin material into a mold cavity having substantially said configuration and a mold volume greater than said predetermined volume;
   partly decreasing said mold volume upon termination of the injection step;
   thereafter heating said mass in said cavity; and
   thereafter compressing the heated mass in confinement in said cavity by reducing said mold volume until it equals said predetermined volume while preventing flow of said mass out of said mold during compression thereof.

2. The method defined in claim 1 wherein said mass is an amino resin injected into said cavity under a pressure only sufficient to fill a part of said cavity without forcing said mass into all portions thereof, said mold volume bearing a ratio to said predetermined volume upon injection of said mass of substantially 3:1 to 6:1 and said mold volume bearing a ratio between its initial state and its partly decreased state of substantially 2:1 to 3:1.

3. A method of molding a synthetic-resin article of predetermined volume and configuration, said method comprising:
   injecting under pressure a mass of an amino resin into a mold cavity having substantially said configuration and a mold volume greater than said predetermined volume, said pressure being only sufficient to fill part of said mold and less than the pressure required to force said mass into all portions of said mold cavity;
   partly decreasing said mold volume upon termination of the injection step;
   thereafter heating said mass in said cavity; and
   thereafter compressing the heated mass in confinement in said cavity by reducing said mold volume until it equals said predetermined volume.

References Cited

UNITED STATES PATENTS

| 2,355,613 | 8/1944 | Wacker | 18—16 |
| 3,137,750 | 6/1964 | Gringas | 264—328 X |
| 3,196,485 | 7/1965 | Battenfeld | 264—328 X |

FOREIGN PATENTS

| 912,695 | 12/1962 | Great Britain | 264—328 |

OTHER REFERENCES

Harris, J., Injection Stamping, SPE Journal, April 1968, vol. 24, p. 61 to 63 relied on.

ROBERT F. WHITE, Primary Examiner

R. R. KUCIA, Assistant Examiner

U.S. Cl. X.R.

264—328